_United States Patent_ [19]

Zillhardt

[11] 4,452,497

[45] Jun. 5, 1984

[54] GREASE SEAL FOR BEARING ARRANGEMENT

[75] Inventor: Paul J. Zillhardt, Reading, Pa.

[73] Assignee: Rockwell International Corporation, Pittsburgh, Pa.

[21] Appl. No.: 519,423

[22] Filed: Aug. 1, 1983

Related U.S. Application Data

[63] Continuation of Ser. No. 422,406, Sep. 20, 1982, abandoned, which is a continuation of Ser. No. 214,355, Dec. 8, 1980, abandoned.

[51] Int. Cl.³ .......................................... F16C 33/78
[52] U.S. Cl. ................................................ 308/187.1
[58] Field of Search ............... 308/187.1, 187.2, 187; 384/140, 139; 277/95

[56] References Cited

U.S. PATENT DOCUMENTS 3,656,824 4/1972 Ullberg .............................. 277/95
3,667,767 6/1972 Bakewell ........................... 277/95
3,790,178 2/1974 Cameron ........................... 277/95

_Primary Examiner_—Lenard A. Footland

[57] ABSTRACT

An improved sealing construction for frictionless bearings having an outer housing with a passage therethrough and an axle located within the passage, the seal comprising inner and outer rings that are secured to the shafts and to the outer housing respectively, and wherein the rings include overlapping flanges that are dimensioned to create a labyrinth path precluding the escape of lubricant from the interior of the bearing.

4 Claims, 1 Drawing Figure

GREASE SEAL FOR BEARING ARRANGEMENT

This application is a continuation of application Ser. No. 422,406 filed Sept. 20, 1982, abandoned, which is a continuation of Ser. No. 214,355, filed Dec. 8, 1980, abandoned.

BACKGROUND OF THE INVENTION

This invention relates to frictionless bearings and more particularly to an improved sealing arrangement for frictionless bearings, particularly for those utilizing rollers as the bearing elements.

A typical frictionless bearing is composed of an outer housing having a bore therethrough, a shaft extending through the bore, inner and outer races and bearing elements, either ball or roller, disposed between the two races. Due to the friction that is developed between the various parts that are rotating relative to each other, it is imperative that the volume defined by the bore of longitudinal opening of the casing be substantially filled with suitable lubricant. Further, it is equally important that the lubricant contained in the housing be prevented from escaping, for obvious reasons. In the past, a variety of ways of sealing frictionless bearing have been tried, such as rings and elastomeric cups which fit between the housing and the centrally disposed shaft. Such existing arrangements very greatly in cost and effectiveness.

It is a principal object of the invention to provide an improved sealing arrangement for frictionless bearings which is easily and economically manufactured and which is effective for long periods of time.

An additional object of this invention is to provide an improved seal for frictionless bearings in which inner and outer sealing elements are provided which cooperate to define a labyrinth path that effectively precludes escape of lubricant from the bearing.

Other objects and advantages of this invention will be in part obvious and in part explained by reference to the accompany specification and drawings in which:

DESCRIPTION OF THE PREFERRED EMBODIMENT

Figure 1:
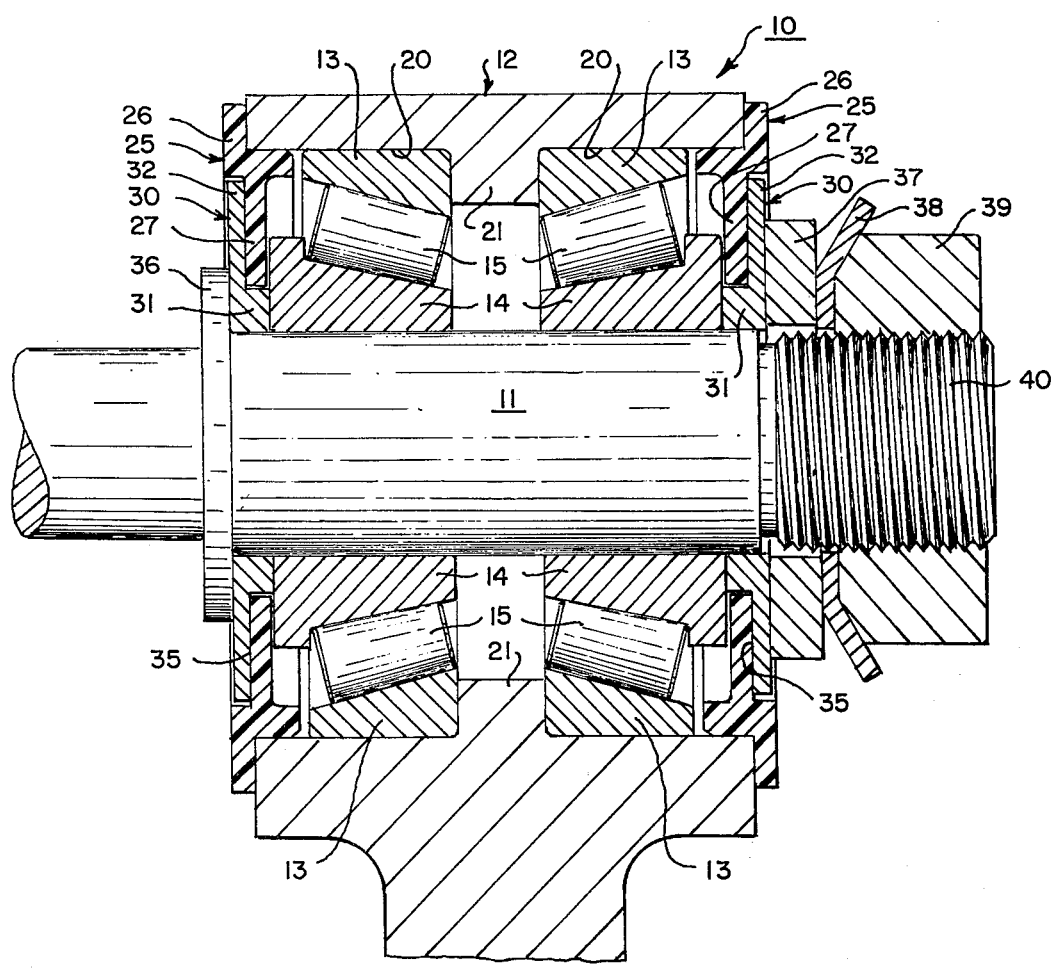
FIG. 1 is a partial cross sectional view through a frictionless bearing showing the improved sealing construction of this invention.

As was indicated earlier, the improved sealing construction disclosed herein is applicable for use with frictionless bearings in which a lubricating medium must be present to reduce the friction between the bearing races and the rotating bearing elements. Although the sealing construction could be used with bearings utilizing balls as the friction reducing elements, the description will relate to and describe the invention in connection with a tapered roller bearing.

For a better understanding of the invention, reference is made to FIG. 1 of the drawings in which the numeral 10 indicates a frictionless bearing that includes a shaft 11, an outer housing 12, an outer bearing race 13, an inner bearing race 14 and a plurality of tapered roller bearing elements 15 that are confined between the outer and inner races 13 and 14. It can be seen that the inner surface 20 of outer housing 12 had a raised portion 21 that defines a web providing for the inclusion of two sets of roller members within the longitudinal opening or passageway that extends through housing 12 to receive the shaft 11.

The improved sealing construction includes a first annular sealing element 25 that has a body portion 26 that fits around the end corner of the outer housing 12 to form a tight seal. Sealing element 25 is thus mounted on the outer housing 12, by means of a press or interference fit, and also has a flange 27 that extends radially inwardly from the outer housing toward that shaft 11. A second sealing element 30 is provided that has an enlarged hub portion 31 mounted on shaft 11 and this second sealing element includes a flange portion 32. Flange 32 extends radially outwardly from hub portion 31 so that its inner surface is in sliding contact with the outer surface of flange 27 on first sealing element 25. This overlapping or interconnecting relationship creates a labyrinth path 35 between adjoining surfaces of first sealing element 25 and second sealing element 30.

Since the first and second sealing elements 25 and 30 are in frictional contact, it is preferred that one or the other be constructed of a suitable thermoplastic material such as Delrin or Nylon. Both of these materials have the required strength and lubricity to permit a sliding fit without harmful frictional heat developing.

It can be seen that the sealing arrangment on each end of the bearing is identical. The sealing construction on one end of the bearing is held in place by means of a collar 36 formed on shaft 11, whereas the opposite end of the bearing is retained by means of washer 37, lock washer 38, and threaded fastener 39 that is retained on the threaded portion 40 of shaft 11.

Although the present invention has been described in connection with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

I claim:

1. A frictionless bearing assembly for mounting on a shaft and having an improved sealing construction, said bearing comprising:
   (a) an inner bearing race mounted on the shaft with one end positioned adjacent an annular collar on the shaft;
   (b) an outer bearing race concentrically surrounding said inner race;
   (c) rotatable bearing elements disposed between said inner and outer races;
   (d) an outer housing in contact with and surrounding said outer race;
   (e) a first sealing element mounted on said outer housing and having a flange that extends radially inwardly from the outer housing toward the shaft and in contact with the outer surface of said inner bearing race;
   (f) a second sealing element having an enlarged hub portion mounted on the shaft and having a flange portion that extends radially outwardly from said hub portion toward said outer housing and is in sliding contact with the flange of said first sealing element;
   (g) fastening means secured to the shaft to exert axial stress against said second sealing element to hold the bearing assembly in operating condition.

2. The improved bearing assembly as defined in claim 1 wherein said first sealing element is press fit into the end of the housing.

3. The improved bearing assembly as defined in claim 1 or 2 wherein said first sealing element is construction of thermoplastic.

4. The improved bearing assembly as defined in claim 1 wherein the flange of said first sealing element extends inwardly a distance sufficient to overlie at least a portion of the inner race so that its innermost surface is adjacent the outer surface of said hub portion of said second sealing element.

* * * * *